(12) United States Patent
Konrad et al.

(10) Patent No.: US 8,163,822 B2
(45) Date of Patent: Apr. 24, 2012

(54) POLYCARBONATE COMPOSITION WITH IMPROVED MELT-FLOWABILITY

(75) Inventors: Stephan Konrad, Dormagen (DE); Rolf Wehrmann, Krefeld (DE); Helmut-Werner Heuer, Krefeld (DE); Karl-Heinz Köhler, Aachen-Brand (DE); Marc Buts, Duffel (BE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/893,135

(22) Filed: Sep. 29, 2010

(65) Prior Publication Data

US 2011/0105659 A1    May 5, 2011

(30) Foreign Application Priority Data

Sep. 30, 2009   (DE) .......................... 10 2009 043 512

(51) Int. Cl.
 *C08K 5/50*   (2006.01)

(52) U.S. Cl. .......................... 524/154; 524/129; 524/139

(58) Field of Classification Search .................. 524/129, 524/139, 154
See application file for complete search history.

(56) References Cited

U.S. PATENT DOCUMENTS

| | | |
|---|---|---|
| 4,670,479 A | 6/1987 | Miyauchi |
| 2003/0013788 A1 | 1/2003 | Mason et al. |
| 2003/0158300 A1 | 8/2003 | Gorny et al. |
| 2004/0225047 A1 | 11/2004 | Hachiya et al. |

FOREIGN PATENT DOCUMENTS

| | | |
|---|---|---|
| CA | 2374444 A1 | 12/2000 |
| DE | 19925125 A1 | 12/2000 |
| EP | 0561629 A2 | 9/1993 |
| EP | 0561638 A1 | 9/1993 |
| EP | 0922728 A2 | 6/1999 |
| EP | 1412412 B1 | 2/2007 |
| JP | 02-219855 A | 9/1990 |
| JP | 08-225736 A | 9/1996 |
| JP | 11-100497 A | 4/1999 |

*Primary Examiner* — Peter Szekely
(74) *Attorney, Agent, or Firm* — Connolly Bove Lodge & Hutz LLP

(57) ABSTRACT

The invention relates to a polycarbonate composition with improved melt-flowability together with good optical properties and together with good hydrolysis resistance.

16 Claims, No Drawings

POLYCARBONATE COMPOSITION WITH IMPROVED MELT-FLOWABILITY

RELATED APPLICATIONS

This application claims benefit to German Patent Application No. 10 2009 043 512.3, filed Sep. 30, 2009, which is incorporated herein by reference in its entirety for all useful purposes.

BACKGROUND OF THE INVENTION

The invention relates to a polycarbonate composition with improved melt-flowability together with good optical properties and together with good hydrolysis resistance.

Production of injection-moulded polycarbonate parts, particularly in the case of thin-walled mouldings, requires that melt-flowability is sufficiently high to permit the injection-moulding procedure to proceed in a fully satisfactory manner. Mouldings of this type are exposed to a very wide variety of ambient conditions, as a function of the application sector, and have to provide fully satisfactory compliance here with a wide variety of demands. The polycarbonate therefore in particular has to have the traditional good optical properties, as well as its processing properties. There must moreover be no alteration of these good properties when, as occurs relatively frequently, the material is exposed to moisture, and this requirement extends to relatively high temperature.

A type of polycarbonate that is of increasing economic importance, therefore being a suitable material for many application sectors, is produced in the melt by what is known as the melt transesterification process, also termed the melt process, from organic carbonates, e.g. diaryl carbonates, and bisphenols, without use of additional solvents.

Production of aromatic polycarbonates by the melt transesterification process is known and by way of example is described in "Schnell", Chemistry and Physics of Polycarbonates, Polymer Reviews, Vol. 9, Interscience Publishers, New York, London, Sydney 1964, in D. C. Prevorsek, B. T. Debona and Y. Kersten, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75-90 (1980), in D. Freitag, U. Grigo, P. R. Müller, N. Nouvertne, BAYER AG, "Polycarbonates" in Encyclopedia of Polymere Science and Engineering, Vol. 11, Second Edition, 1988, pages 648-718 and finally in Des. U. Grigo, K. Kircher and P. R. Müller "Polycarbonate" in Becker/Braun, Kunststoff-Handbuch [Plastics handbook], Volume 3/1, Polycarbonate, Polyacetale, Polyester, Celluloseester [Polycarbonates, polyacetals, polyesters and cellulose esters], Carl Hanser Verlag Munich, Vienna 1992, pages 117-299.

Melt polycarbonates which comprise organic phosphorus compounds, e.g. phosphines, phosphine oxides, phosphinites, phosphonites, phosphites, disphosphines, diphosphinites, diphosphonites, diphosphites, phosphinates, phosphonates, phosphates, diphosphinates, diphosphonates and diphosphate compounds, have been described by way of example in EP-A-1 412 412, and also in JP-08-225736 and JP-11-100497. EP-A-1 412 412 mentions the improved hydrolysis resistance properties of melt polycarbonates modified in this way. However, the disclosures do not contain any indications of an improvement in rheological or optical properties of a polycarbonate.

Melt polycarbonates which comprise aliphatic fatty acid esters have also been widely disclosed in the literature, for example in U.S. Pat. No. 2,004,225047 or EP-A-561 638, which describe the improved demouldability and surface quality of injection-moulded parts made of polycarbonate moulding compositions of this type. No indications of an improvement in rheological or optical properties of the polycarbonate moulding compositions can be found in the said disclosure.

JP 02-219855 describes polycarbonate moulding compositions which comprise trialkyl phosphates and esters of saturated fatty acids, but does not describe combinations with further phosphorus compounds. There are no indications of hydrolysis resistance or of rheological properties. Nor is it possible to discern whether the property improvements mentioned in that document also apply to melt polycarbonates.

EP 561629 contains examples of melt polycarbonate moulding compositions which comprise phosphite and aliphatic fatty acid ester, and which have improved demoulding behaviour. However, the disclosure provides no indications of rheological properties or hydrolysis resistance. However, comparative trials reveal that moulding compositions of this type which comprise phosphite and aliphatic fatty acid ester have markedly impaired hydrolysis resistance, leading to disadvantageous alterations in the optical and mechanical properties of the mouldings produced therefrom.

It was therefore an object of the invention to produce moulding compositions from a melt polycarbonate which has improved processing properties in terms of melt-flowability together with good hydrolysis resistance and good optical properties.

EMBODIMENTS OF THE INVENTION

An embodiment of the present invention is a composition comprising a melt polycarbonate, at least one phosphine of formula (I), and at least one aliphatic carboxylic ester:

wherein
$Ar_1$ and $Ar_2$
are, identically or differently optionally substituted aryl moieties, and
R' is an optionally substituted aryl moiety or one of the following moieties (Ia) to (Ih)

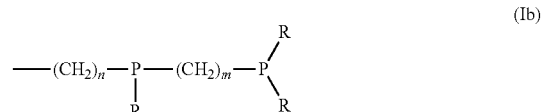

-continued

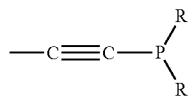
(Id)

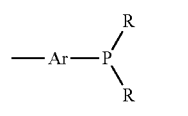
(Ie)

where Ar = R
(C$_6$-C$_{14}$-aryl moiety)

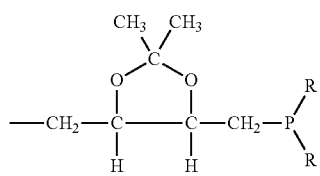
(If)

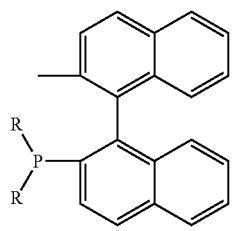
(Ig)

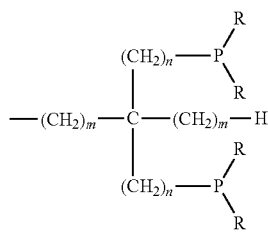
(Ih)

wherein
R is an optionally substituted C$_6$-C$_{14}$-aryl moiety,
n and m
are respectively and independently of one another an integer from 1 to 7 and wherein the H atoms of moieties (Ia) to (Ic) are optionally replaced by substituents, and with the proviso that R' can also be optionally substituted 4-phenyl-phenyl or optionally substituted α-naphthyl if both of the Ar moieties in formula (I) are also respectively optionally substituted 4-phenyl-phenyl or optionally substituted α-naphthyl.

Another embodiment of the present invention is the above composition, further comprising at least one alkyl phosphate.

Another embodiment of the present invention is the above composition, wherein said melt polycarbonate comprises a compound of formula (IV)

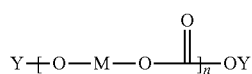
(IV)

wherein
the square bracket indicates repeating structural units,
Y is H or a group of formula (X)

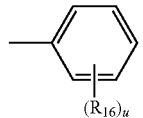
(X)

wherein
R$_{16}$, is, identically or differently, H, C$_1$ to C$_{20}$-alkyl, C$_6$H$_5$, or C(CH$_3$)$_2$C$_6$H$_5$, and
u is 0, 1, 2, or 3,
M is Ar or a polyfunctional group A, B, or C, or a group D, wherein
Ar is a group of formula (VIII) or (IX),

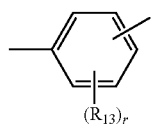
(VIII)

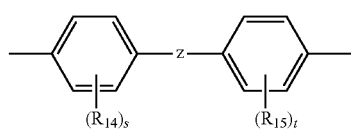
(IX)

wherein
Z is C$_1$ to C$_8$-alkylidene, C$_5$ to C$_{12}$-cycloalkylidene, S, SO$_2$, or a single bond,
R$_{13}$, R$_{14}$, and R$_{15}$
are independently of each other an optionally a substituted or unsubstituted C$_1$-C$_{18}$ alkyl moiety, preferably substituted or unsubstituted phenyl, methyl, propyl, ethyl, butyl, Cl or Br,
r, s, and t
are, independently of one another, 0, 1, or 2,
the polyfunctional group A is a group of formula

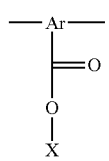
(A)

the polyfunctional group B is a group of formula

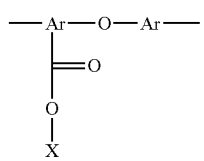
(B)

the polyfunctional group C is a group of formula

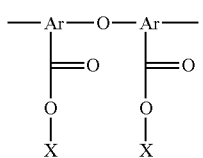

wherein
X is Y or -[MOCOO]$_n$—Y, wherein M and Y are as defined above, group D is a group of formula

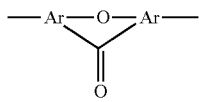

and the entirety of polyfunctional groups A, B, C and D is ≧5 mg/kg.

Another embodiment of the present invention is the above composition, wherein said at least one phosphine of formula (I) is a compound of formula (I), the oxidic form thereof, or a mixture thereof.

Another embodiment of the present invention is the above composition, wherein said at least one phosphine of formula (I) is triphenylphosphine, the oxidic form thereof, or a mixture thereof.

Another embodiment of the present invention is the above composition, wherein up to 80% of said at least one phosphine of formula (I) is in its oxidic form.

Another embodiment of the present invention is the above composition, wherein said at least one alkyl phosphate is of formula (II):

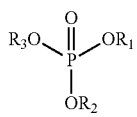

wherein
$R_1$, $R_2$, and $R_3$ are identically or differently H or a linear, branched, or cyclic alkyl group.

Another embodiment of the present invention is the above composition, wherein said at least one alkyl phosphate comprises at least one of mono-, di-, or triisooctyl phosphate.

Another embodiment of the present invention is the above composition, wherein said at least one aliphatic carboxylic ester is a compound of formula (III):

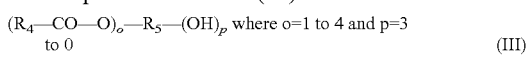

where $R_4$ is an aliphatic saturated or unsaturated, linear, cyclic or branched alkyl moiety and $R_5$ is an alkylene moiety of a mono- to tetrahydric aliphatic alcohol $R_5$—$(OH)_{o+p}$.
wherein Another embodiment of the present invention is the above composition, wherein said at least one aliphatic carboxylic ester comprises esters of pentaerythritol, glycerol, trimethylolpropane, propanediol, stearyl alcohol, cetyl alcohol, or myristyl alcohol with myristic, palmitic, stearic, or montanic acid, or mixtures thereof.

Another embodiment of the present invention is the above composition, wherein said at least one phosphine of formula (I) is used in an amount of from 10 to 2000 mg/kg based on the total weight of said composition.

Another embodiment of the present invention is the above composition, wherein said at least one alkyl phosphate is used in an amount of from 0.5 to 500 mg/kg based on the total weight of said composition.

Another embodiment of the present invention is the above composition, wherein said at least one aliphatic carboxylic ester is used in an amount of from 50 to 8000 mg/kg based on the total weight of said composition.

Yet another embodiment of the present invention is a process for producing the above composition, comprising producing said melt polycarbonate via a melt transesterification reaction of a bisphenol and a carbonic diester.

Yet another embodiment of the present invention is a process for producing the above composition, comprising producing said melt polycarbonate via condensation of a carbonate oligomer containing hydroxy and/or carbonate end groups, a bisphenol, and a carbonic diester.

Yet another embodiment of the present invention is a process for producing the above composition, comprising introducing said at least one phosphine of formula (I) and said at least one carboxylic ester into the melt stream of said melt polycarbonate via an ancillary extruder downstream from a final polycondensation stage and mixing said at least one phosphine of formula (I), said at least one carboxylic ester, and said melt polycarbonate in a static mixer.

Yet another embodiment of the present invention is a process for producing the above composition, comprising metering said at least one carboxylic ester using a membrane pump or any other suitable pump into the melt stream of said melt polycarbonate downstream from an ancillary extruder and upstream from a static mixer.

Yet another embodiment of the present invention is a moulding comprising the above composition.

DESCRIPTION OF THE INVENTION

Surprisingly, it has now been found that melt polycarbonates which comprise a combination according to the invention of particular organic phosphorus compounds and comprise aliphatic carboxylic ester provide excellent compliance with the above property requirements.

In order to overcome disadvantages of the prior art, the object of the invention was achieved via production of melt polycarbonate moulding compositions which comprise, as phosphorus compounds, a mixture of specific phosphines, in particular of triarylphosphines and if appropriate of alkyl phosphates and which comprise aliphatic carboxylic esters. The aliphatic carboxylic esters present in the moulding compositions are esters of aliphatic long-chain carboxylic acids with mono- or polyhydric aliphatic and/or aromatic hydroxyl compounds. These moulding compositions according to the invention feature improved melt-flowability together with good optical properties and together with good hydrolysis resistance.

The invention therefore provides a polycarbonate composition made of what is known as a melt polycarbonate, produced in the melt from diaryl carbonate and from bisphenols, and comprising specific phosphines, in particular triarylphosphines, and if appropriate alkyl phosphates and aliphatic carboxylic esters.

Phosphines used according to the invention are compounds of the general formula (I):

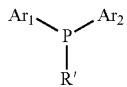
(I)

where Ar₁ and Ar₂ are identical or different unsubstituted or substituted aryl moieties and R' is an unsubstituted or substituted aryl moiety or one of the following moieties (Ia) to (Ih)

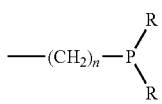
(Ia)

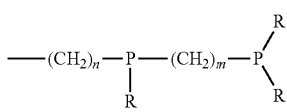
(Ib)

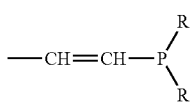
(Ic)

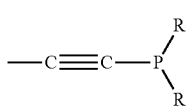
(Id)

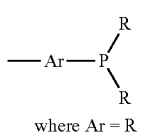
(Ie)

where Ar = R
($C_6$-$C_{14}$-aryl moiety)

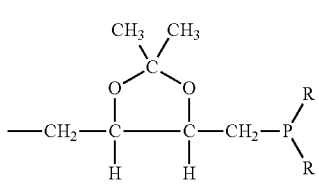
(If)

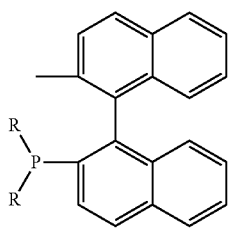
(Ig)

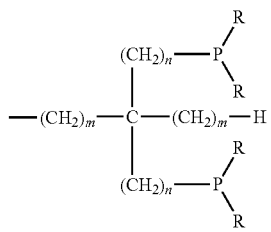
(Ih)

in which R is an unsubstituted or substituted $C_6$-$C_{14}$-aryl moiety and, "n" and "m" respectively independently of one another are an integer from 1 to 7 and where the H atoms of the moieties (Ia) to (Ic) can also have been replaced by substituents and where R' can also be 4-phenyl-phenyl or α-naphthyl, if both of the Ar moieties in formula (I) are respectively likewise 4-phenyl-phenyl or α-naphthyl. The 4-phenyl-phenyl moieties and the α-naphthyl moieties here can also bear substituents.

Preferred moieties Ar in (I) are phenyl, 4-phenyl-phenyl and naphthyl.

Suitable substituents of the aryl moieties Ar in (I) are F, CH₃, Cl, Br, I, OCH₃, CN, OH, alkylcarboxy, phenyl, cycloalkyl, alkyl.

Suitable substituents for the H atoms of the moieties (Ia) to (Ic) are F, CH₃, alkyl, cycloalkyl, Cl, aryl.

Preferred numbers "n" and "m" are 1, 2, 3 or 4.

Aryl is respectively independently an aromatic moiety having from 4 to 24 skeletal carbon atoms, where, within these, no, one, two or three skeletal carbon atoms per ring (aromatic ring made of C atoms), but at least one skeletal carbon atom, within the entire molecule, can have been substituted by heteroatoms, selected from the group of nitrogen, sulphur or oxygen. However, it is preferable that aryl is a carbocyclic aromatic moiety having from 6 to 24 skeletal carbon atoms. The same applies to the aromatic portion of an arylalkyl moiety, and also to aryl constituents of groups of greater complexity, (such as aryl-carbonyl moieties or aryl-sulphonyl moieties.)

Examples of $C_6$-$C_{24}$-aryl are phenyl, o-, p-, m-tolyl, naphthyl, phenanthrenyl, anthracenyl or fluorenyl, and examples of heteroaromatic $C_4$-$C_{24}$-aryl where, within these, no, one, two or three skeletal carbon atoms per ring (aromatic ring made of C atoms), but at least one skeletal carbon atom within the entire molecule, can have been substituted by heteroatoms, selected from the group of nitrogen, sulphur or oxygen, are pyridyl, pyridyl N-oxide, pyrimidyl, pyridazinyl, pyrazinyl, thienyl, furyl, pyrrolyl, pyrazolyl, imidazolyl, thiazolyl, oxazolyl or isoxazolyl, indolizinyl, indolyl, benzo[b]thienyl, benzo[b]furyl, indazolyl, quinolyl, isoquinolyl, naphthyridinyl, quinazolinyl, benzofuranyl or dibenzofuranyl, for example.

Examples of phosphines suitable according to the invention are triphenylphosphine, tritolylphosphine, tri-p-tert-butylphenylphosphine or the oxides of these. The phosphine used is preferably triphenylphosphine.

Examples of the diarylphosphines to be used according to the invention are 1,2-bis(dipentafluorophenylphosphino)

ethane, bis(diphenylphosphino)acetylene, 1,2-bis (diphenylphosphino)benzene,

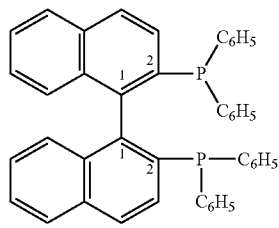

[2,2'-bis(diphenylphosphino)-1,1'-binaphthyl], 2,3-bis (diphenylphosphino)butane, 1,4-bis (diphenylphosphino) butane, 1,2-bis(diphenylphosphino)ethane, cis-1,2-bis (diphenyl-phosphino)ethylene.

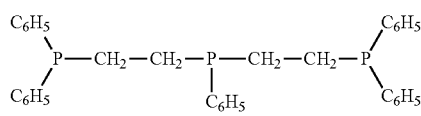

[Bis(2-(diphenylphosphino)ethyl)phenylphosphine], bis (diphenylphosphino)methane, 2,4-bis(diphenylphosphino)pentane, 1,3-bis(diphenylphosphino)propane, 1,2-bis(diphenyl-phosphino)propane,

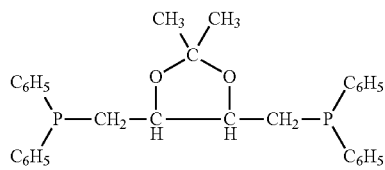

[4,5-O-isopropylidene-2,3-dihydroxy-1,4-bis(diphenylphosphino)butane], tri(4-diphenyl)-phosphine and tris (α-naphthyl)phosphine.

The diarylphosphines can be produced by using the following information from the literature:
Issleib et al., Chem. Ber., 92 (1959), 317-3182 and Hartmann et al., Zeitschr. Anorg. Ch. 287 (1956) 261-272.

It is also possible to use mixtures of various phosphines. The amounts used of the phosphines used are from 10 to 2000 mg/kg, preferably from 30 to 800 mg/kg, particularly preferably from 50 to 500 mg/kg based on the total weight of the composition.

The moulding compositions according to the invention can comprise, alongside the phosphines used, up to 80%, based on the phosphine used, of the corresponding phosphine oxides.

Alkyl phosphates optionally used according to the invention are compounds of the general formula (II):

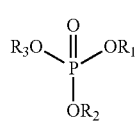

(II)

where $R_1$ to $R_3$ can be H or identical or different linear, branched or cyclic alkyl moieties. Particular preference is given to $C_1$-$C_{18}$-alkyl moieties. Examples of $C_1$-$C_{18}$-alkyl are methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, n-heptyl and n-octyl, pinacyl, adamantyl, the isomeric menthyl moieties, n-nonyl, n-decyl, n-dodecyl, n-tridecyl, n-tetradecyl, n-hexadecyl or n-octadecyl.

Examples of suitable alkyl phosphates according to the invention are mono-, di- and trihexyl phosphate, triisoctyl phosphate and trinonyl phosphate. The alkyl phosphate used is preferably triisooctyl phosphate (tris-2-ethylhexyl phosphate). It is also possible to use mixtures of various mono-, di- and trialkyl phosphates. The amounts used of the alkyl phosphates used are less than 500 mg/kg, preferably from 0.5 to 500 mg/kg, particularly preferably from 2 to 500 mg/kg, based on the total weight of the composition.

Aliphatic carboxylic esters used according to the invention are esters of aliphatic long-chain carboxylic acids with mono- or polyhydric aliphatic and/or aromatic hydroxyl compounds. Aliphatic carboxylic esters used with particular preference are compounds of the general formula (III):

$(R_4-CO-O)_o-R_5-(OH)_p$ where o=1 to 4 and p=3 to 0  (III)

where $R_4$ is an aliphatic saturated or unsaturated, linear, cyclic or branched alkyl moiety and $R_5$ is an alkylene moiety of a mono- to tetrahydric aliphatic alcohol $R_5-(OH)_{o+p}$.

$C_1$-$C_{18}$-Alkyl moieties are particularly preferred for $R_4$. Examples of $C_1$-$C_{18}$-alkyl are methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, n-heptyl and n-octyl, pinacyl, adamantyl, the isomeric menthyl moieties, n-nonyl, n-decyl, n-dodecyl, n-tridecyl, n-tetradecyl, n-hexadecyl or n-octadecyl.

Alkylene is a straight-chain, cyclic, branched or unbranched $C_1$-$C_{18}$-alkylene moiety. Examples of $C_1$-$C_{18}$-alkylene are methylene, ethylene, n-propylene, isopropylene, n-butylene, n-pentylene, n-hexylene, n-heptylene, n-octylene, n-nonylene, n-decylene, n-dodecylene, n-tridecylene, n-tetradecylene, n-hexadecylene or n-octadecylene.

In the case of esters of polyhydric alcohols, it is also possible that free, unesterified OH groups are present. Examples of aliphatic carboxylic esters suitable according to the invention are: glycerol monostearate, palmityl palmitate, and stearyl stearate. It is also possible to use mixtures of various carboxylic esters of the formula (III). Carboxylic esters used with preference are esters of pentaerythritol, glycerol, trimethylolpropane, propanediol, stearyl alcohol, cetyl alcohol or myristyl alcohol with myristic, palmitic, stearic or montanic acid and mixtures thereof. Particular preference is given to pentaerythrityl tetrastearate, glycerol monostearate, stearyl stearate and propanediol distearate, and mixtures thereof. The amounts used of the carboxylic esters are from 50 to 8000 mg/kg, preferably from 100 to 7000 mg/kg based on the total weight of the composition.

The polycarbonate to be used according to the invention is produced via the melt transesterification reaction of suitable bisphenols and diaryl carbonates in the presence of a suitable catalyst. The polycarbonate can also be produced via condensation of carbonate oligomers which contain hydroxy and/or carbonate end groups, and are suitable diaryl carbonates and bisphenols.

Preferred carbonate oligomers are described via the formula (IV) with molar masses of from 153 to 15,000 [g/mol].

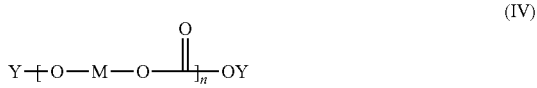
(IV)

Where Y=H or an unsubstituted or substituted aryl moiety.

Suitable diaryl carbonates in the context of the invention are di-$C_6$- to di-$C_{14}$-aryl esters, preferably the diesters of phenol or of alkyl- or aryl-substituted phenols, i.e. diphenyl carbonate, dicresyl carbonate and di-4-tert-butylphenyl carbonate. Diphenyl carbonate is most preferred.

Among the suitable di-$C_6$ to di-$C_{14}$-aryl esters are also asymmetrical diaryl esters which contain two different aryl substituents. Preference is given to phenyl cresyl carbonate and 4-tert-butylphenyl phenyl carbonate.

Among the suitable diaryl esters are also mixtures of more than one di-$C_6$-$C_{14}$-aryl ester. Preferred mixtures are mixtures of diphenyl carbonate, dicresyl carbonate and di-4-tert-butylphenyl carbonate.

The amounts that can be used of the diaryl carbonate, based on 1 mole of diphenol, are from 1.00 to 1.30 mol, particularly preferably from 1.02 to 1.20 mol and most preferably from 1.05 to 1.15 mol.

Suitable dihydroxyaryl compounds in the context of the invention are those corresponding to the formula (V):

(V)

in which
$R_6$ is substituted or unsubstituted phenyl, methyl, propyl, ethyl, butyl, Cl or Br and q is 0, 1 or 2.

Preferred dihydroxybenzene compounds are 1,3-dihydroxybenzene, 1,4-dihydroxybenzene and 1,2-dihydroxybenzene.

Suitable dihydroxydiaryl compounds in the context of the invention are those that correspond to the formula (VI):

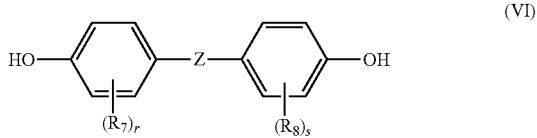
(VI)

where
Z is $C_1$ to $C_8$-alkylidene or $C_5$ to $C_{12}$-cycloalkylidene, S, $SO_2$ or a single bond,
$R_7$, $R_8$ independently of one another is a substituted or unsubstituted phenyl, methyl, propyl, ethyl, butyl, Cl or Br and
r, s independently of one another is 0, 1 or 2.

Preferred diphenols are 4,4'-dihydroxybiphenyl, 4,4'-dihydroxydiphenyl sulphide, 1,1bis(4-hydroxphenyl)cyclohexane, 1,2-bis(4-hydroxyphenyl)benzene, 1,3-bis(4-hydroxyphenyl)benzene, 1,4-bis(4-hydroxyphenyl)benzene, bis(4-hydroxyphenyl)methane, 2,2-bis(4-hydroxyphenyl)propane, 2,4-bis(4-hydroxyphenyl)-2-methylbutane, 2,2-bis(3_methyl-4-hydroxy-phenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, bis(4-hydroxyphenyl)sulphone, 1,2-bis[2-(4-hydroxyphenyl)isopropyl]benzene, 1,3-bis[2-(4-hydroxyphenyl)isopropyl]benzene, 1,4-bis[2-(4-hydroxyphenyl)isopropyl]benzene, 1,1-bis(4-hydroxyphenyl)-1-phenylethane, 2,4-bis(4-hydroxyphenyl)-2-methylbutane, 2,2-bis(3,5-dichloro-4-hydroxyphenyl)propane, 2,2-bis(3,5-dibromo-4-hydroxyphenyl)propane, 1,1-bis(4-hydroxyphenyl)-3,3,5trimethylcyclohexane.

The most preferred diphenols are 1,1-bis(4-hydroxyphenyl)-1-phenylethane, 2,2-bis(4-hydroxyphenyl)propane, 4,4'-dihydroxybiphenyl, 1,1-bis(4-hydroxyphenyl)-3,3,5-trimethylcyclohexane, 2,2-bis(3,5-dibromo-4-hydroxyphenyl) propane and 1,3-bis[2-(4-hydroxyphenyl)isopropyl]benzene.

Among the suitable diphenols are also mixtures of more than one diphenol; the result here would be a copolycarbonate. The most preferred mixing partners are 1,3-bis[2-(4-hydroxyphenyl)isopropyl]benzene, 1,1-bis(4-hydroxyphenyl)-3,3,5-trimethylcyclohexdane, 2,2-bis(4-hydroxyphenyl)propane, 4,4'-dihydroxybiphenyl and 2,2-bis (3,5-dibromo-4-hydroxyphenyl)propane.

A branching agent can also be added, examples being compounds which contain three functional phenolic OH groups. The branching would increase the extent of non-Newtonian flow behaviour. Among the suitable branching agents are phloroglucinol, 3,3-bis(3-methyl-4-hydroxyphenyl)-2-oxo-2,3-dihydroindole, 4,6-dimethyl-2,4,6-tris(4-hydroxyphenyl)hept-2-ene, 4,6-dimethyl-2,4,6-tris(4_hydroxyphenyl)heptane, 1,3,5-tris-(4-hydroxyphenyl)benzene, 1,1,1-tris(4-hydroxyphenyl)ethane, tris(4-hydroxyphenyl) phenylmethane, 2,2-bis[4,4-bis(4-hydroxyphenyl) cyclohexyl]propane, 2,4-bis(4-hydroxyphenylisopropyl) phenol, 2,6-bis(2-hydroxy-5'-methylbenzyl)-4-methylphenol, 2-(4-hydroxyphenyl)-2-(2,4-dihydroxyphenyl)propane, hexakis(4-(4-hydroxyphenylisopropyl)phenyl)orthoterephthalate, tetrakis (4-hydroxyphenyl)methane, tetrakis(4-(4-hydroxyphenylisopropyl)phenoxy)methane, 1,4-bis((4',4"-dihydroxytriphenyl)methyl)benzene and isatinbiscresol, pentaerythritol, 2,4-dihydroxybenzoic acid, trimeric acid, cyanuric acid.

Examples of catalysts suitable for producing the polycarbonates according to the invention are those of the general formula (VII)

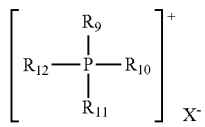
(VII)

in which $R_9$, $R_{10}$, $R_{11}$ and $R_{12}$ independently of one another are identical or different $C_1$- to $C_{18}$-alkylene moieties, $C_6$ to $C_{10}$-aryl moieties or $C_5$ to $C_6$-cycloalkyl moieties and $X^-$ can be an anion for which the corresponding acid-base pairing $H^+ + X^- \rightarrow$. HX has $pK_b$ of <11.

Preferred catalysts are tetraphenylphosphonium fluoride, tetraphenylphosphonium tetraphenylborate and tetraphenylphosphonium phenolate. Tetraphenylphosphonium phenolate is most preferred. Examples of preferred amounts of phosphonium-salt catalysts are from $10^{-2}$ to $10^{-8}$ mol per mole of diphenol, and the most preferred amounts of catalyst are from $10^{-4}$ to $10^{-6}$ mol per mole of diphenol. It is also possible if appropriate to use cocatalysts in addition to the phosphonium salt(s), in order to increase the polymerization rate.

These cocatalysts can by way of example be salts of alkali metals and of alkaline earth metals, e.g. hydroxides, alkoxides and aryl oxides of lithium, sodium and potassium, preferably hydroxide, alkoxide or aryl oxide salts of sodium. Sodium hydroxide- and sodium phenolate are most preferred. The amounts of the cocatalyst can by way of example be in the range from 1 to 200 µg/kg, preferably from 5 to 150 µg/kg and most preferably from 10 to 125 µg/kg in each case based on the mass of the dihydroxydiaryl compound used, respectively calculated in the form of sodium.

The polycarbonates can be produced in stages, the temperatures can be conducted in stages in the range from 150 to 400° C., the residence time in each stage can be from 15 minutes to 5 hours, and the pressures in each stage can be from 1000 to 0.01 mbar. It is particularly preferable that the temperature increases from one stage to the next and that the pressure decreases from one stage to the next.

The melt polycarbonates preferably used are characterized via the general formula (IV)

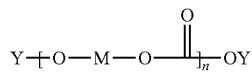
(IV)

where the square bracket indicates repeating structural units, M is Ar or a polyfunctional group A, B, C, or else group D, where Ar can be a group represented by formula (VIII) or (IX), preferably (IX)

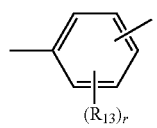
(VIII)

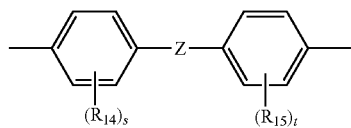
(IX)

in which

Z is $C_1$ to $C_s$-alkylidene or $C_5$ to $C_{12}$-cycloalkylidene, S, $SO_2$ or a single bond, $R_{13}$, $R_{14}$, $R_{15}$ are independently of the others a substituted or unsubstituted $C_1$-$C_{18}$ alkyl moiety, preferably substituted or unsubstituted phenyl, methyl, propyl, ethyl, butyl, Cl or Br and r, s, t independently of one another can be 0, 1 or 2, where the polyfunctional group A is a group of the formula

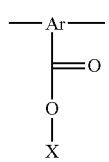
(A)

where the polyfunctional group B is a group of the formula

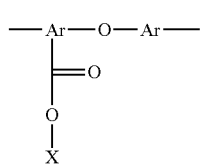
(B)

where the polyfunctional group C is a group of the formula

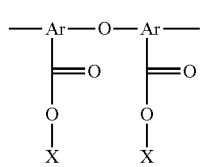
(C)

where group D is a group of the formula

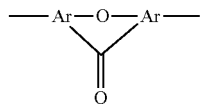
(D)

and the entirety of polyfunctional groups A, B, C and D is ≧5 mg/kg,
where Y=H or a group of the formula (X)

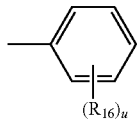
(X)

where
$R_{16}$, identical or different, can be H, $C_1$ to $C_{20}$-alkyl, $C_6H_5$ or $C(CH_3)_2C_6H_5$, and
u can be 0, 1, 2 or 3,
where X=Y or -[MOCOO]$_n$—Y, where M and Y are defined as above.

The polycarbonate used according to the invention can have an average molecular weight, determined via gel permeation chromatography, of from 5,000 to 80,000, preferably from 10,000 to 60,000 and most preferably from 15,000 to 40,000.

Ar is preferably:

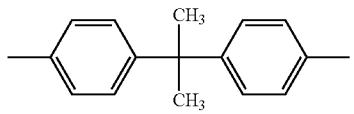

The polyfunctional group A is preferably the group A1:

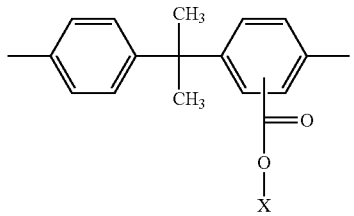
(A1)

The group B is preferably the group B1:

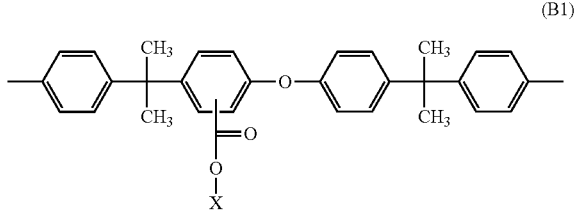
(B1)

The polyfunctional group C is preferably the group C1:

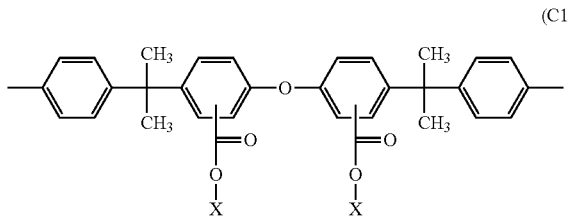
(C1)

In the groups A1, B1 and C1, X is as defined above. The group D is preferably the group D1:

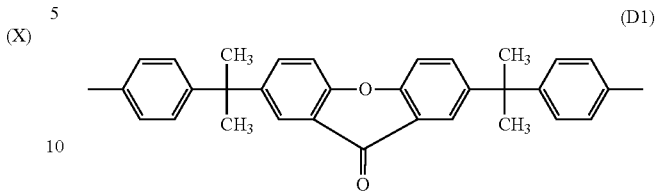
(D1)

The melt polycarbonates described above are mentioned merely by way of example. The total amounts of components A to D present in the melt polycarbonate are ≧5 mg/kg.

The compositions according to the invention (melt polycarbonate moulding compositions) can by way of example be produced by mixing the respective constituents in a known manner and subjecting them to compounding in the melt and melt extrusion at temperatures of from 200° C. to 400° C. in conventional assemblies, such as internal kneaders, extruders and twin-shaft-screw systems. The mixing of the individual constituents can take place either in succession or else simultaneously, and specifically either at about 20° C. (room temperature) or at a higher temperature. However, the compounds used according to the invention can also be introduced separately into the melt polycarbonate moulding composition within different phases of the production process. By way of example, therefore, the alkyl phosphate and/or the phosphine can be introduced into the melt polycarbonate during or at the end of the polycondensation process, before aliphatic carboxylic esters are added.

The form in which the compounds according to the invention are added is not subject to any limitation. The inventive compounds and, respectively, mixtures of the compounds according to the invention can be added in the form of solids, e.g. in the form of powder, in solution or in the form of a melt, to the polymer melt. It is preferable that the feed of the organic phosphorus compounds and of the aliphatic carboxylic esters takes place by way of an ancillary extruder downstream of the final polycondensation stage. In large-scale industrial embodiments, it is particularly preferable to operate an ancillary extruder with a throughput of, for example, from 200 to 1000 kg of polycarbonate per hour.

In one preferred embodiment, the optional feed of alkyl phosphates takes place by way of example at room temperature in liquid form together with polycarbonate into the hopper of the polycarbonate supply system of the ancillary extruder. By way of example, a membrane pump or any other suitable pump is used to feed the alkyl phosphate. Addition of phosphines preferably takes place in liquid form at a temperature of about 80 to 250° C. downstream of the hopper of the polycarbonate supply system, into an extruder zone equipped with mixing elements. The phosphines here are taken from a circuit which is preferably maintained at a pressure of from 2 to 20 bar and preferably maintained at a temperature of from 80 to 250° C. A control valve can be used to control the amount added.

Downstream of the ancillary extruder, a gear pump can particularly preferably be installed in order to increase pressure. The carboxylic esters used can preferably be metered into the material downstream of the ancillary extruder and upstream of the static mixer with a membrane pump or with any other suitable pump. The feed of the carboxylic esters then preferably takes place in liquid form particularly preferably at from 80 to 250° C. with a membrane pump at elevated pressure, particularly preferably of from 50 to 250 bar, downstream of the gear pump. As an alternative, the carboxylic esters can also be introduced into the mixing zone of the ancillary extruder by way of a control valve, into the melt stream.

In one particularly preferred embodiment, there is a static mixer downstream of the ancillary extruder and of all of the additive-feed points, in order to ensure good mixing of all of the additives. The polycarbonate melt from the ancillary extruder is then introduced into the main stream of polycarbonate melt. The mixing of the main stream of melt with the melt stream from the ancillary extruder takes place by way of a further static mixer.

As an alternative to liquid feed, the feed of the phosphines and of the carboxylic esters can take the form of a masterbatch (concentrate of the additives in polycarbonate), or of pure solids, by way of the hopper of the polycarbonate supply system of the ancillary extruder. This type of masterbatch can comprise further additives.

It is also possible, by way of example, to introduce all of the additives subsequently into the granulated polycarbonate via compounding.

The rheological properties are determined via measurement of the melt viscosity of the moulding compositions according to the invention in Pa·s at temperatures of from 280° C. to 320° C. as a function of shear gradient, which can vary from 50 to 5000 [1/s]. A capillary rheometer is used for the measurement in accordance with ISO 11443.

The optical properties of the moulding compositions according to the invention are determined via measurement of what is known as the Yellowness Index (YI) on standard test specimens in accordance with ASTM E313. Table 1 and Table 2 collate the results.

The hydrolysis resistance of the moulding compositions according to the invention is determined via what is known as a boiling test in water, where standard test specimens are placed in pure water at reflux at standard pressure for a period of 250 h. Alterations in these mouldings are determined visually, and also via measurement of notched impact resistance in accordance with ISO 180/1C and via measurement of relative solution viscosity. The relative solution viscosity eta rel is determined in methylene chloride (0.5 g of polycarbonate/l) at 25° C. in an Ubbelohde viscometer. Table 3 collates the results.

The moulding compositions according to the invention can be used for producing mouldings of any type.

By way of example, these can be produced via injection moulding, extrusion and blow-moulding processes. Another form of processing is production of mouldings via thermoforming from previously produced sheets or foils.

Examples of the mouldings according to the invention are profiles, foils, casing parts of any type, e.g. for domestic devices such as juice presses, coffee machines, mixers; for office machinery such as monitors, printers, copiers; for sheets, pipes, electrical ducting, windows, doors and profiles for the construction sector, interior fittings and outdoor applications; in the electrical engineering sector, for example for switches and plugs. The mouldings according to the invention can moreover be used for the interior fittings and components of rail vehicles, of ships, of aircraft, of buses and of other motor vehicles, and also for bodywork parts of motor vehicles.

The mouldings according to the invention can be transparent, translucent or opaque. Particular other mouldings are optical and magneto-optical data storage systems, such as minidisc, compact disc (CD) or digital versatile disc (DVD), food-and-drink packaging, optical lenses and prisms, lenses for lighting purposes, automobile headlamp lenses, glazing for construction vehicles and for motor vehicles, panels of any type, for example for greenhouses, and the products known as twin-web sandwich panels or panels having cavities.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The compounded materials according to the invention were produced in a ZE25/3 extruder from Berstorff, Hannover, with throughput of 10 kg/h. The barrel temperatures were from 220 to 260° C. The form in which the various additives were metered in to the mixture was that of a powder mixture with polycarbonate powder—5% by weight based on the total ingoing weight.

PC 1 is a polycarbonate without additives based on bisphenol A and DPC with a melt volume flow rate (MVR) of 12.5 cm$^3$/10 min (300° C./1.2 kg). Polyfunctional compounds A: 343 ppm, B 32 ppm, C: 18 ppm, D: 76 ppm.

PC 2 is a polycarbonate based on bisphenol A with 250 ppm of triphenylphosphine (TPP) and 100 ppm of triisooctyl phosphate (TOF) and with MVR of 12.5 cm$^3$/10 min (300° C./1.2 kg). Polyfunctional compounds A: 340 ppm, B: 39 ppm, C: 15 ppm, D: 129 ppm.

PC 3 is a polycarbonate without additives based on bisphenol A with MVR of 19 cm$^3$/10 min (300° C./1.2 kg). Polyfunctional compounds A, B, C and D below the detectable limit.

Table 1 shows that Example 1 comprises no additives, whereas Examples 2 and 3 comprise no phosphorus additives. Examples 1 to 3 serve as comparative examples.

Examples 4 and 5 comprise not only phosphorus additives (triphenylphosphine TPP and triisooctyl phosphate TOF) but also aliphatic carboxylic esters (glycerol monostearate (GMS) and are in accordance with the invention.

When Examples 4 and 5 according to the invention are compared with Examples 1 to 3 not according to the invention, they exhibit improved flowability, determined on the basis of the melt viscosities measured, and improved optical properties, clearly apparent from the lower YI value.

The examples according to the invention shown in Table 1 therefore provide evidence of the improved optical properties and the improved flowability in comparison with the examples not according to the invention.

Table 2 shows that Example 6 comprises no additives. Examples 7 and 8 comprise no phosphorus additives. Examples 6 to 8 serve as comparative examples.

Examples 9, 10 and 11 comprise, according to the invention, not only phosphorus additives (triphenylphosphine TPP and triisooctyl phosphate TOF) but also aliphatic carboxylic esters (pentaerythritol tetrastearate PETS).

When Examples 9 to 11 according to the invention are compared with Examples 6 to 8 not according to the invention, they exhibit improved flowability, determined on the basis of the melt viscosities measured, and improved optical properties, clearly apparent from the lower YI value.

The examples according to the invention shown in Table 2 therefore provide evidence of the improved optical properties and the improved flowability in comparison with the examples not according to the invention.

Example 12 in Table 3 comprises triphenylphosphine and pentaerythritol tetrastearate, therefore according to the invention.

Example 13 comprises trialkyl phosphite (tris[(3-ethyl-3-oxetanyl)methyl]phosphite) and pentaerythritol tetrastearate, therefore not according to the invention.

When Example 12 according to the invention in Table 3 is compared with Example 13 not according to the invention it exhibits substantially higher hydrolysis resistance. In the case of Example 13 not according to the invention, after as little as 50 h in water, there is a drastic deterioration in notched impact resistance (brittle fracture) and solution viscosity, while the mouldings according to the invention still exhibit ductile fracture and have only marginally reduced solution viscosity. After 100 h, in the case of Example 13 not according to the invention, the mouldings are observed to have clouding caused by what is known as spangle effect as well as having poorer solution viscosity after the water-treatment, whereas in the case of Example 12 according to the invention again only marginal alteration of solution viscosity is observed, and no alteration of appearance.

The example according to the invention shown in Table 3 therefore provides evidence of improved hydrolysis resistance in comparison with the example not according to the invention.

TABLE 1

Glycerol monostearate (GMS) as aliphatic carboxylic ester

|  |  | 1* | 2* | 3* | 4 | 5 |
|---|---|---|---|---|---|---|
| PC 1 | % | 95 | 95 | 95 | — | — |
| PC 2 | % | — | — | — | 95 | 95 |
| PC 3 | % | 5 | 4.6 | 4.2 | 4.6 | 4.2 |
| GMS | % | — | 0.4 | 0.8 | 0.4 | 0.8 |

TABLE 1-continued

Glycerol monostearate (GMS) as aliphatic carboxylic ester

|  |  | 1* | 2* | 3* | 4 | 5 |
|---|---|---|---|---|---|---|
| Melt viscosity, 300° C. | | | | | | |
| 50 | Pas | — | 361 | — | — | — |
| 100 | Pas | 398 | 359 | — | 223 | — |
| 200 | Pas | 382 | 334 | — | 222 | — |
| 500 | Pas | 337 | 284 | 212 | 205 | 118 |
| 1000 | Pas | 283 | 240 | 201 | 182 | 112 |
| 1500 | Pas | 243 | 210 | 178 | 164 | 105 |
| 5000 | Pas | 126 | 117 | 111 | 99 | 72 |
| Melt viscosity, 320° C. | | | | | | |
| 100 | Pas | — | 184 | — | — | — |
| 200 | Pas | 214 | 180 | — | 98 | — |
| 500 | Pas | 198 | 167 | 130 | 95 | 60 |
| 1000 | Pas | 175 | 148 | 126 | 89 | 58 |
| 1500 | Pas | 158 | 134 | 119 | 84 | 56 |
| 5000 | Pas | 95 | 90 | 81 | 61 | 44 |
| Optical data in 4 mm | | | | | | |
| Yellowness Index (YI) | | 2.12 | 2.21 | 2.09 | 2.05 | 1.89 |

*Comparative example

TABLE 2

Petaerythritol tetrastearate (PETS) as aliphatic carboxylic ester

|  |  | 6* | 7* | 8* | 9 | 10 | 11 |
|---|---|---|---|---|---|---|---|
| PC 1 | % | 95 | 95 | 95 | — | — | — |
| PC 2 | % | — | — | — | 95 | 95 | 95 |
| PC 3 | % | 5 | 4.8 | 4.6 | 4.8 | 4.6 | 4.2 |
| PETS | % | — | 0.2 | 0.4 | 0.2 | 0.4 | 0.8 |
| Melt viscosity, @ 300° C. | | | | | | | |
| 50 | Pas | — | — | — | — | — | — |
| 100 | Pas | 367 | 394 | 388 | 360 | 352 | 332 |
| 200 | Pas | 357 | 378 | 371 | 347 | 337 | 327 |
| 500 | Pas | 334 | 334 | 326 | 310 | 303 | 291 |
| 1000 | Pas | 280 | 278 | 272 | 262 | 256 | 246 |
| 1500 | Pas | 242 | 238 | 233 | 227 | 220 | 213 |
| 5000 | Pas | 120 | 125 | 123 | 120 | 118 | 115 |
| Melt viscosity, @ 320° C. | | | | | | | |
| 50 | Pas | — | — | — | — | — | — |
| 100 | Pas | — | — | — | — | — | — |
| 200 | Pas | 217 | 208 | 199 | 191 | 190 | 179 |
| 500 | Pas | 202 | 197 | 186 | 180 | 178 | 168 |
| 1000 | Pas | 180 | 177 | 168 | 162 | 161 | 152 |
| 1500 | Pas | 161 | 160 | 153 | 147 | 145 | 139 |
| 5000 | Pas | 96 | 96 | 93 | 90 | 89 | 86 |
| Opt. data in 4 mm | | | | | | | |
| Yellowness Index | | 2.39 | 2.09 | 1.96 | 1.92 | 1.86 | 1.85 |

*Comparative example

TABLE 3

Hydrolysis resistance test

| | | 12 | 13* |
|---|---|---|---|
| PC 1 | % | 95 | 95 |
| PC 3 | % | 4.55 | 4.55 |
| Pentaerythritol tetrastearate (PETS) | % | 0.4 | 0.4 |
| Triphenylphosphine (TPP) | % | 0.05 | — |
| Tris[(3-ethyl-3-oxetanyl)methyl]phosphite | % | — | 0.05 |
| Hydrolysis resistance | | | |
| eta rel TS | | 1.281 | 1.278 |
| Notched impact resistance, ISO 180/1 C. | kJ/m² | 8 × n.f. | 8 × n.f. |
| 50 h boiling test | | | |
| eta rel TS | | 1.275 | 1.211 |
| Notched impact resistance, ISO 180/1 C. | kJ/m² | 3 × 165b | 9 × 66b |
| | | 5 × n.f. | |
| Appearance | | unaltered | unaltered |
| 100 h boiling test | | | |
| eta rel TS | | 1.276 | 1.17 |
| Appearance | | unaltered | severe spangle effect |
| 250 h boiling test | | | |
| eta rel TS | | 1.27 | 1.123 |
| Appearance | | some slight spangle effect | very cloudy with severe spangle effect very brittle easily fractured |

*Comparative example
n.f. = no fracture
b = brittle

The invention claimed is:

1. A process for producing a composition comprising a melt polycarbonate, at least one phosphine of formula (I), and at least one aliphatic carboxylic ester:

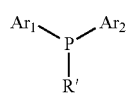
(I)

wherein $Ar_1$ and $Ar_2$ are, identically or differently optionally substituted aryl moieties, and R' is an optionally substituted aryl moiety or one of the following moieties (Ia) to (Ih)

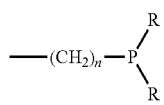
(Ia)

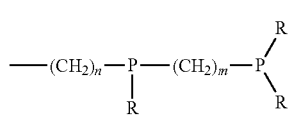
(Ib)

—CH=CH—P(R)(R)
(Ic)

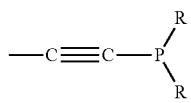
(Id)

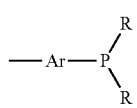
(Ie)

where Ar = R
($C_6$-$C_{14}$-aryl moiety)

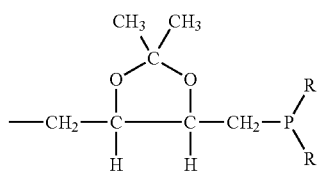
(If)

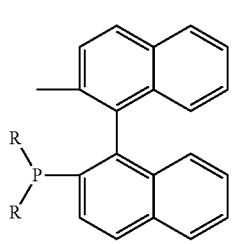
(Ig)

-continued

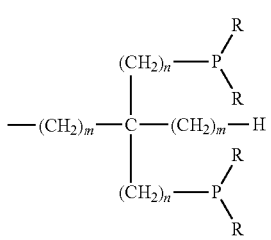
(Ih)

wherein
R is an optionally substituted $C_6$-$C_{14}$-aryl moiety,
n and m
  are respectively and independently of one another an integer from 1 to 7 and wherein the H atoms of moieties (Ia) to (Ic) are optionally replaced by substituents, and with the proviso that R' can also be optionally substituted 4-phenyl-phenyl or optionally substituted α-naphthyl if both of the Ar moieties in formula (I) are also respectively optionally substituted 4-phenyl-phenyl or optionally substituted a α-naphthyl;

said process comprising introducing said at least one phosphine of formula (I) and said at least one carboxylic ester into the melt stream of said melt polycarbonate via an ancillary extruder downstream from a final polycondensation stage and optionally mixing said at least one phosphine of formula (I), said at least one carboxylic ester, and said melt polycarbonate in a static mixer.

2. The process of claim 1, further comprising at least one alkyl phosphate.

3. The process of claim 1, wherein said melt polycarbonate comprises a compound of formula (IV)

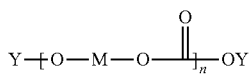
(IV)

wherein
the square bracket indicates repeating structural units,
Y is H or a group of formula (X)

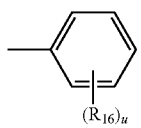
(X)

wherein
  $R_{16}$, is, identically or differently, H, $C_1$ to $C_{20}$-alkyl, $C_6H_5$, or $C(CH_3)_2C_6H_5$, and
  u is 0, 1, 2, or 3,
M is Ar or a polyfunctional group A, B, or C, or a group D,
wherein
Ar is a group of formula (VIII) or (IX),

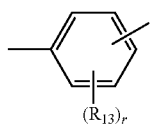
(VIII)

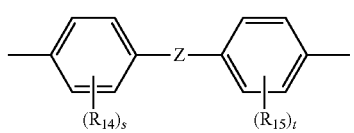
(IX)

wherein
  Z is $C_1$ to $C_8$-alkylidene, $C_5$ to $C_{12}$-cycloalkylidene, S, $SO_2$, or a single bond,
  $R_{13}$, $R_{14}$, and $R_{15}$
    are independently of the others a substituted or unsubstituted $C_1$-$C_{18}$ alkyl moiety, preferably substituted or unsubstituted phenyl, methyl, propyl, ethyl, butyl, Cl or Br,
  r, s, and t
    are, independently of one another, 0, 1, or 2,
the polyfunctional group A is a group of formula

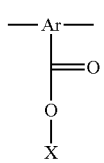
(A)

the polyfunctional group B is a group of formula

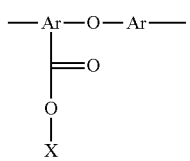
(B)

the polyfunctional group C is a group of formula

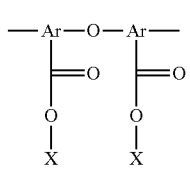
(C)

wherein

X is Y or -[MOCOO]$_n$—Y, wherein M and Y are as defined above, group D is a group of formula

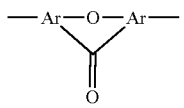

(D)

and the entirety of polyfunctional groups A, B, C and D is ≧5 mg/kg.

4. The process of claim 1, wherein said at least one phosphine of formula (I) is a compound of formula (I), the oxidic form thereof, or a mixture thereof.

5. The process of claim 1, wherein said at least one phosphine of formula (I) is triphenylphosphine, the oxidic form thereof, or a mixture thereof.

6. The process of claim 1, wherein up to 80% of said at least one phosphine of formula (I) is in its oxidic form.

7. The process of claim 2, wherein said at least one alkyl phosphate is of formula (II):

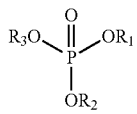

(II)

wherein $R_1$, $R_2$, and $R_3$ are identically or differently H or a linear, branched, or cyclic alkyl group.

8. The process of claim 7, wherein said at least one alkyl phosphate comprises at least one of mono-, di-, or triisooctyl phosphate (tris-2-ethylhexyl phosphate).

9. The process of claim 1, wherein said at least one aliphatic carboxylic ester is a compound of formula (III):

$(R_4\text{—CO—O})_o\text{—}R_5\text{—(OH)}_p$ where o=1 to 4 and p=3 to 0   (III)

wherein $R_4$ is an aliphatic saturated or unsaturated, linear, cyclic or branched alkyl moiety and $R_5$ is an alkylene moiety of a mono- to tetrahydric aliphatic alcohol $R_5\text{—(OH)}_{o+p}$.

10. The process of claim 1, wherein said at least one aliphatic carboxylic ester comprises esters of pentaerythritol, glycerol, trimethylolpropane, propanediol, stearyl alcohol, cetyl alcohol, or myristyl alcohol with myristic, palmitic, stearic, or montanic acid, or mixtures thereof.

11. The process of claim 1, wherein said at least one phosphine of formula (I) is used in an amount of from 10 to 2000 mg/kg based on the total weight of said composition.

12. The process of claim 2, wherein said at least one alkyl phosphate is used in an amount of from 0.5 to 500 mg/kg based on the total weight of said composition.

13. The process of claim 1, wherein said at least one aliphatic carboxylic ester is used in an amount of from 50 to 8000 mg/kg based on the total weight of said composition.

14. The process of claim 1, comprising producing said melt polycarbonate via a melt transesterification reaction of a bisphenol and a carbonic diester.

15. The process of claim 1, comprising producing said melt polycarbonate via condensation of a carbonate oligomer containing hydroxy and/or carbonate end groups, a bisphenol, and a carbonic diester.

16. The process of claim 1, comprising metering said at least one carboxylic ester using a membrane pump into the melt stream of said melt polycarbonate downstream from an ancillary extruder and upstream from a static mixer.

* * * * *